United States Patent [19]
Hope

[11] Patent Number: 6,025,096
[45] Date of Patent: Feb. 15, 2000

[54] SOLID STATE POLYMERIC ELECTROLYTE FOR ELECTROCHEMICAL DEVICES

[76] Inventor: Stephen F. Hope, c/o Hope Industries, Willow Grove, Pa. 19090

[21] Appl. No.: 07/891,300

[22] Filed: May 29, 1992

Related U.S. Application Data

[63] Continuation-in-part of application No. 07/767,466, Sep. 30, 1991, abandoned, which is a continuation-in-part of application No. 07/572,253, Aug. 27, 1990, abandoned.

[51] Int. Cl.$^7$ .................................................... H01M 6/18
[52] U.S. Cl. ........................................... 429/317; 252/62.2
[58] Field of Search ..................................... 429/192, 104, 429/317; 252/62.2

[56] References Cited

U.S. PATENT DOCUMENTS

| | | | |
|---|---|---|---|
| 4,792,504 | 12/1988 | Schwab et al. | 252/62.2 X |
| 5,001,023 | 3/1991 | Cheshire et al. | 429/192 X |
| 5,110,694 | 5/1992 | Nagasubramanian et al. | 252/62.2 X |
| 5,162,175 | 11/1992 | Visco et al. | 429/192 |
| 5,187,032 | 2/1993 | Sasaki et al. | 429/192 |

*Primary Examiner*—John S. Maples
*Attorney, Agent, or Firm*—Zachary T. Wobensmith, III

[57] ABSTRACT

A solid state polymeric electrolyte which is formed by complexing an alkaline metal triflate salt and polyethylene oxide with an ester an ether or a pyrrolidinone and an ether, or two ethers of different boiling points as co-solvents to form a solid or semi-solid state electrolyte.

36 Claims, No Drawings

SOLID STATE POLYMERIC ELECTROLYTE FOR ELECTROCHEMICAL DEVICES

CROSS REFERENCE TO RELATED APPLICATIONS

This application is a continuation in part of a prior co-pending application in the name of Stephen F. Hope, Ser. No. 07/767,466, filed Sep. 30, 1991, now abandoned, entitled "Solid State Polymeric Electrolyte for Batteries and the Like" which was a continuation in part of a prior co-pending application in the name of Henry F. Hope (now deceased) and Stephen F. Hope; Ser. No. 07/572,253, filed Aug. 27, 1990, now abandoned, entitled "Solid State Polymeric Electrolyte for Batteries".

BACKGROUND OF THE INVENTION

1. Field of the Invention

A solid or semi-solid state electrolyte for alkali metal or alkaline earth metal batteries, and other electrochemical devices, which has been solidified by an alkali metal or alkaline earth metal triflate salt and toughened by partial evaporation of an ether component.

2. Description of the Prior Art

In the prior art various polymers have been used as a component of the electrolytes of solid state alkali and alkaline earth metal batteries, and various other kinds of electrochemical devices.

Among the problems associated with these polymers is that they have inherent relatively low ionic conductivity, and also may react with the component materials, which may be an alkali metal, such as lithium, or other metallic anodes to form a non-conductive boundary layer, or which have a crystaline structure that prevents the free flow of ions, and hinders rechargability.

The prior art polymer containing electrolytes may also exhibit poor adherence to the electrodes, and do not possess sufficient strength to prevent the punching through of dendrites, and consequent shorting of the battery.

The U.S. Pat. No. 5,001,023 to Cheshire et al., describes solid electrolyte devices which include a conductive anode and cathode separated by a solid electrolyte. The solid electrolyte comprises a matrix of polymer main chains, which have side chains linked to the main chains, the side chains comprising polar groups free from active hydrogen atoms. The electrolyte also includes a polar aprotic liquid dispersed in the matrix and an ionised ammonium, alkali metal or alkaline earth metal salt dissolved in the matrix. While the Cheshire patent calls for the addition of lithium triflate to the mixture, it is not used for solidification which he accomplishes by cross linking.

Also Cheshire's method is very slow in requiring a matter of hours for mass production of batteries and the mentioned terpolymer (D1) has side chains and therefore it is not a polyethylene oxide.

In other described examples, Cheshire uses various crosslinked polymers with side chains. Cheshire does not mention the usefulness of his electrolyte for secondary (cylcable) batteries and other electrochemical devices.

The U.S. Pat. No. 5,006,432 to Hope, et al., describes a solid state polymer electrolyte for batteries, where the electrolyte is formed by mixing an ultraviolet light or electron beam curable polymer with an electrolyte, and curing the mixture, whereby the polymer cross links and forms the electrolyte.

The U.S. Pat. No. 5,017,444 to Nakajima, discloses a lithium cell which includes a negative pole of lithium and a positive pole of a vanadium fluoride graphite intercalation compound of the formula CxVF6 where x is from 8 to 80.

While the prior art disclosures may incorporate lithium triflate, they cross link the polymer for solidification of the electrolyte, which does not occur in the present invention. In addition, the prior art devices may not contain all the required compounds, such as polyethylene oxide, as called for in the present invention.

In another example, a liquid electrolyte has been compounded, which consisted of propylene carbonate (PC) and 1,2 dimethoxyethane (DME) and lithium perchlorate salt. However, this liquid electrolyte mixture will not solidify when polyethylene oxide (PEO) is added.

In addition, this and like mixtures will not solidify, if for example alkali metal salts such as lithium hexafluoroarsenate, lithium hexafluorophospate and lithium tetrafluoroborate are used.

While a solid state electrolyte has been made using polyethlene oxide and lithium triflate alone, it did not possess sufficient conductivity, or cyclability, or strength even when propylene carbonate was added.

The solid state polymer electrolytes herein do not suffer from the prior art problems and provide many positive advantages.

SUMMARY OF THE INVENTION

It has now been found that solid state electrolytes which are highly ion conductive, inert to alkali or alkaline earth metal battery components, flexible but tough enough to resist dendrite formation, can be made by compounding alkali metal triflate salts and polyethylene oxide with co-solvents of esters and ethers, (particularly propylene carbonate and 1,2 dimethoxyethane) or pyrrolidinones and ethers, or with two ethers where one of them has a higher boiling point. Solidification of the electrolyte is achieved by the presence of the alkali metal triflate salt, (trifluoromethanesulfonate,) and subsequent toughening of the solid state electrolyte is achieved by partial evaporation of the lower boiling point ether component. The remaining lower boiling point ether component further enhances ionic conductivity and cyclability.

The principal object of the invention is to provide a solid or semi-solid state polymer electrolyte for batteries and other electrochemical devices.

A further object of the invention is to provide an electrolyte of the character aforesaid that has excellent adherence, desired viscosity, and low shrinkage properties.

A further object of the invention is to provide an electrolyte of the character aforesaid, that is flexible, tough and resistant to dendrite formation, but easy to handle and produce.

A further object of the invention is to provide an electrolyte of the character aforesaid that allows rapid processing.

Other objects and advantageous features of the invention will be apparent from the description and claims.

DESCRIPTION OF THE PREFERRED EMBODIMENTS

Batteries such as alkali metal batteries, and for example lithium batteries, consist of at least an anode layer, a polymer electrolyte layer, and a cathode layer. Such batteries can be of virtually any desired size and configuration, and usually include additional layers such as current conducting backing layers, insulating layers and electrode connection layers.

The polymer dilectric or electrolyte layer must be compatible with the component materials used to fabricate the batteries while possessing suitable ionic conductivity.

In the described battery a base is provided, which can be a web of material such as nickel foil or carbon fibers coated with a cathode material of well known type, such as described in U.S. Pat. No. 4,960,655.

The cathode may have an additional layer of polymeric electrolyte composition applied thereto, which composition may be of any well known polymeric material, such as polyethylene oxide and propylene carbonate compounded with a lithium salt.

An additional layer of anode material is applied on top of the electrolyte layer, which can be a base layer of carbon fibers coated with lithium as described in prior U.S. Pat. No. 4,794,059, or of lithiuum foil to form an anode layer.

The resultant battery can be provided with other layers as desired.

The solid state polymeric electrolyte for example, which is suitable for lithium batteries, contains an ester such as propylene carbonate (PC) in the range of 20% to 90% by weight, an ether such as 1,2 dimethoxyethane (DME) in the range of 4% to 70% by weight, an ion conductive salt, such as lithium triflate ($CF_3 SO_3 Li$) in the range of 1% to 30% by weight, and polyethylene oxide (PEO) in the range of 0.2% to 60% by weight. The PC can be replaced by other esters such as butylene carbonate, and others or by a pyrrolidinone such as N-methyl pyrrolidinone, 1,5-dimethyl-2 pyrrolidinone and others or by polyethylene glycol dimethyl ether (PEGDME) which is an ether with a higher boiling point, of the same percent weight range. The DME can also be replaced by other low boiling point ethers, such as 1,2 dimethoxypropane and others of the same % weight range. Various combinations of ion conductive esters, ethers and pyrrolidinones are also useful, such as a plurality of esters and an ether, a plurality of ethers and an ester and other combinations as described in claims.

The lithium triflate salt has a dual purpose: one as an ionic conductor, and the second as a solidification agent of the electrolyte without crosslinking. The PEO is without side chains.

It should be noted that for other alkali metal batteries, and electrochemical devices, the lithium triflate salt should be replaced by a corresponding triflate salt to match the elected alkali metal.

A preferred embodiment of the invention is illustrated in the following examples:

EXAMPLE I

A sample of polymeric electrolyte was formed by compounding a lithium salt and a polymeric material which consisted of 42.75% (percent) by weight of propylene carbonate (PC), 42.75% (percent) by weight of 1,2 dimethoxyethane (DME), 11% (percent) by eight of lithium triflate and 3.5% (percent) by weight of polyethylene oxide (PEO).

The mixture was heated to 70° C. and became liquid, the hot liquid was applied by well known means to an electrode layer and was cooled to 27° C. or less, for 5 minutes to allow partial evaporation of the DME. The mixture solidified due to the presence of lithium triflate and formed a solid or semi-solid, ion conuctive layer with a skin of desired thickness, porosity, strength and adherence. Immediately after the 5 minute cooling period, the second electrode was added on top of the electrolyte layer, which stopped the evaporation, and resulted in a battery cell of 3.4 to 3.6 volts, which is capable of being loaded to 3.75 $mA/cm^2$, and is rechargeable.

EXAMPLE II

A sample of polymeric electrolyte was formed by compounding a lithium salt and a polymeric material which consisted of 42.75% (percent) by eight of propylene carbonate (PC), 42.75% (percent) by weight of 1,2 dimethoxypropane (DMP), 11% (percent) by weight of lithium triflate and 3.5% (percent) by weight of polyethylene oxide (PEO).

The mixture was heated to 70° C. and became liquid, the hot liquid was applied by well known means to an electrode layer and was cooled to 27° C. or less, for 5 minutes to allow partial evaporation of the DMP. The mixture solidified due to the presence of lithium triflate and formed a solid or semi-solid, ion conductive layer with a skin of desired thickness, porosity, strength and adherence. Immediately after the 5 minute cooling period, the second electrode was added on top of the electrolyte layer, which stopped the evaporation, and resulted in a battery cell with a voltage in the range of 3.4 to 3.6 volts, which is capable of being loaded to 3.75 $mA/cm^2$ and is rechargeable.

EXAMPLE III

A sample of polymeric electrolyte was formed by compounding a lithium salt and a polymeric material which consisted of 42.75% (percent) by weight of 1,5 dimethyl-2, pyrrolidinone, 42.75% (percent) by weight of 1,2 dimethoxyethane (DME), 11% (percent) by weight of lithium triflate and 3.5% (percent) by weight of plyethylene oxide PEO).

The mixture was heated to 70° C. and became liquid, the hot liquid was applied by well known means to an electrode layer and was cooled to 27° C. or less, for 5 minutes to allow partial evaporation of the DME. The mixture solidified due to the presence of lithium triflate and formed a solid or semi-solid, ion conductive layer with a skin of desired thickness, porosity, strength and adherence. Immediately after the 5 minute cooling period, the second electrode was added on top of the electrolyte layer, which stopped the evaporation, and resulted in a battery cell with a voltage in the range of 3.4 to 3.6 volts, which is capable of being loaded to 3.75 $mA/cm^2$ and is rechargeable.

EXAMPLE IV

A sample of polymeric electrolyte was formed by compounding a lithium salt and a polymeric material which consisted of 42.75% (percent) by weight of polyethylene glycol dimethyl ether (PEGDME), 42.75% (percent) by weight of 1,2 dimethoxyethane (DME), 11% (percent) by weight of lithium triflate and 3.5% (percent) by weight of polyethylene oxide (PEO).

The mixture was heated to 70° C. and became liquid, the hot liquid was applied by well known means to an electrode layer and was cooled to 27° C. or less, for 5 minutes to allow partial evaporation of the DME. The mixture solidified due to the presence of lithium triflate and formed a solid or semi-solid, ion conductive layer with a skin of desired thickness, porosity, strength and adherence. Immediately after the 5 minute cooling period, the second electrode was added on top of the electrolyte layer, which stopped the evaporation, and resulted in a battery cell with a voltage in the range of 3.4 to 3.6 volts, which is capable of being loaded to 3.75 $mA/cm^2$ and is rechargeable.

EXAMPLE V

A sample of polymeric electrolyte was formed by compounding a lithium salt and a polymeric material which consisted of 42.75% (percent) by weight of propylene carbonate (PC), 21.375% (percent) by weight of 1,2 dimethoxyethane (DME), 21.375% (percent) by weight of tetrahydrofuran (THF), 11% (percent) by weight of lithium triflate and 3.5% (percent) by weight of polyethylene oxide (PEO).

The mixture was heated to 70° C. and became liquid, the hot liquid was applied by well known means to an electrode layer and was cooled to 27° C. or less, for 5 minutes to allow partial evaporation of the DME and THF. The mixture solidifed due to the presence of lithium triflate and formed a solid or semi-solid, ion conductive layer with a skin of desired thickness, porosity, strength and adherence. Immediately after the 5 minute cooling period, the second electrode was added on top of the electrolyte layer, which stopped the evaporation, and resulted in a battery cell with a voltage in the range of 3.4 to 3.6 volts, which is capable of being loaded to 3.75 mA/cm$^2$ and is rechargeable.

As can be seen from the above examples, this approach to producing solid state electrolyte is very useful for rapid mass production of batteries and the like in a matter of minutes, instead of hours, without using ultra-violet light, electron beam or heat for crosslinking. The above described electrolytes are very highly loaded with the polar aprotic liquids, and in fact are much higher than prior art electrolytes.

It should, of course, be understood that the description is merely illustrative and that various modifications and changes can be made in the structure disclosed without departing from the spirit of the invention.

It is thus apparent that the objects of the invention have been achieved.

I claim:

1. A polymeric solid state electrolyte for batteries, capacitors and other electrochemical devices wherein the electrolyte contains an alkali metal or alkaline earth metal triflate salt and polyethylene oxide, compounded with a co-solvent of an ester and an ether, in which solidification of the electrolyte is accomplished by the presence of the triflate salt and by partial evaporation of the ether component.

2. A polymeric solid state electrolyte as defined in claim 1 in which
    said co-solvent consists of propylene carbonate and 1, 2-dimethoxyethane.

3. A polymeric solid state electrolyte as defined in claim 1 in which
    said ether is 1,2 dimethoxy propane.

4. A polymeric solid state electrolyte as defined in claim 1 in which
    said co-solvent consists of a plurality of esters and an ether.

5. A polymeric solid state electrolyte as defined in claim 1 in which
    said co-solvent consists of a plurality of esters and a pluracity of ethers.

6. A polymeric sold state electrolyte as defined in claim 5 in which
    said co-solvent consists of ethylene carbonate, propylene carbonate, 1,2 dimethoxyethane and tetrahydrofuran.

7. A polymeric solid state electrolyte as defined in claim 5 in which
    said co-solvent consists of ethylene carbonate, propylene carbonate, 1,2 dimethoxyethane and 2 methyl tetrahydrofuran.

8. A polymeric solid state electrolyte as defined in claim 1 in which
    said co-solvent consists of an ester and a plurality of ethers.

9. A polymeric solid state electrolyte as defined in claim 8 in which
    said co-solvent consists of propylene carbonate and 1, 2 dimethoxyethane and tetrahydrofuran.

10. A polymeric solid state electrolyte as defined in claim 8 in which
    said co-solvent consists of ethylene carbonate, 1,2 dimethoxyethane and tetrahydrofuran.

11. A polymeric solid state electrolyte as defined in claim 8 in which
    said co-solvent consists of ethylene carbonate, 1,2 dimethoxyethane and 2 methyl tetrahydrofuran.

12. A polymeric solid state electrolyte as defined in claim 8 in which
    said co-solvent consists of propylene carbonate, 1,2 dimethoxyethane and 2 methyl tetrahydrofuran.

13. A polymeric solid state electrolyte as defined in claim 1 in which
    said co-solvent consists of propylene carbonate and tetrahydrofuran.

14. A polymeric solid state electrolyte as defined in claim 1 in which
    said co-solvent consists of ethylene carbonate and 2-methyl tetrahydrofuran.

15. A polymeric solid state electrolite as defined in claim 1 in which
    said co-solvent consists of ethylene carbonate and tetrahydrofuran.

16. A polymeric solid state electrolyte as defined in claim 1 in which
    said co-solvent consists of ethylene carbonate and 1,2 dimethoxyethane.

17. A polymeric solid state electrolyte as defined in claim 1 which is used in secondary batteries and other cyclable electrochemical devices.

18. A polymeric solid state electrolyte as defined in claim 1 in which
    said ester is butylene carbonate.

19. A polymeric solid state electrolyte for batteries, capacitors and other electrochemical devices wherein the electrolyte contains an alkali metal or alkaline earth metal triflate salt and polyethylene oxide, compounded with a co-solvent which consists of a pyrrolidinone and an ether in which solidification of the electrolyte is accomplished by the presence of the triflate salt and by partial evaporation of the ether component.

20. A polymeric solid state electrolyte as defined in claim 19 in which
    said alkali metal triflate salt is lithium trifluoromethanesulfonate.

21. A polymeric solid state electrolyte as defined in claim 19 in which
    said pyrrolidinone is N-methylpyrrolidinone.

22. A polymeric solid state electrolyte as defined in claim 19 in which said pyrrolidinone is 1,5 dimethyl-2, pyrrolidinone.

23. A polymeric solid state electrolyte as defined in claim 19 in which
    said ether is 1,2 dimethoxy propane.

24. A polymeric solid state electrolyte as defined in claim 19 in which said co-solvent consists of a pyrrolidinone and a plurality of ethers.

25. A polymeric solid state electrolyte as defined in claim 19 in which
said co-solvent consists of a plurality of pyrrolidinones and a plurality of ethers.

26. A polymeric solid state electrolyte as defined in claim 19 in which
said co-solvent consists of an ether and a plurality of pyrrolidinones.

27. A polymeric solid state electrolyte as defined in claim 19 in which
said alkali metal triflate salt is lithium trifluoromethane-sulfonate.

28. A polymeric solid state electrolyte as defined in claim 19 which is used in secondary batteries and other cyclable electrochemical devices.

29. A polymeric solid state electrolyte for batteries, capacitors and other electrochemical devices wherein the electrolyte contains an alkali metal or alkaline earth metal triflate salt and polyethylene oxide, compounded with a co-solvent which consists of two ethers with different boiling points, in which solidification of the electrolyte is accomplished by the presence of the triflate salt and by partial evaporation of the ether component.

30. A polymeric solid state electrolyte as defined in claim 29 in which
one ether component of said co-solvent is polyethylene glycol dimethyl ether.

31. A polymeric solid state electrolyte as defined in claim 29 in which
said co-solvent consists of a plurality of ethers with one ether having a lower boiling point then the rest of said ethers.

32. A polymeric solid state electrolyte as defined in claim 29 in which
said co-solvent consists of a plurality of first ethers and a plurality of second ethers,
said second ethers having lower boiling points than said first ethers.

33. A polymeric solid state electrolyte as defined in claim 29 in which
said co-solvent consists of a first ether and a plurality of second ethers, which have a lower boiling point, than said first ether.

34. A polymeric solid state electrolyte as defined in claim 29 in which
said alkali metal triflate salt is lithium trifluoromethane-sulfonate.

35. A polymeric solid state electrolyte as defined in claim 29 in which
one of said ethers is 1,2 dimethoxy propane.

36. A polymeric solid state electrolyte as defined in claim 29 which is used in secondary batteries and other cyclable electrochemical devices.

* * * * *